United States Patent
Levine

(10) Patent No.: US 8,189,760 B2
(45) Date of Patent: May 29, 2012

(54) VARIABLE-TIME CALL FORWARDING TO VOICEMAIL

(75) Inventor: David Levine, Smyrna, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 782 days.

(21) Appl. No.: 12/265,033

(22) Filed: Nov. 5, 2008

(65) Prior Publication Data

US 2010/0111281 A1    May 6, 2010

(51) Int. Cl.
*H04M 3/42* (2006.01)
*H04M 1/64* (2006.01)

(52) U.S. Cl. ........... 379/211.02; 379/88.22; 379/207.09; 379/212.01

(58) Field of Classification Search ............. 379/211.02, 379/93.19, 88.12, 88.19, 88.21, 88.22, 67.1, 379/207.09, 201.01, 212.01, 207.15
See application file for complete search history.

(56) References Cited

U.S. PATENT DOCUMENTS 6,493,431 B1 *  12/2002  Troen-Krasnow et al. 379/88.12
2008/0075248 A1 *  3/2008  Kim .......................... 379/93.19

* cited by examiner

*Primary Examiner* — Thjuan K Addy
(74) *Attorney, Agent, or Firm* — Cantor Colburn LLP

(57) ABSTRACT

Unanswered calls route to voicemail after a variable number of ring cycles based on a history with the voicemail user. The history may include the caller's identity, the user's answering history, and user preferences. If the caller is not identified, an unanswered call may go to voicemail after a default number of ring cycles. If a caller has a history of previous calls to the user/called party, that history may increase or decrease the default number of ring cycles for that caller. For example, callers whose previous calls to the voicemail user have been answered may receive more ring cycles before going to voicemail. Conversely, callers whose previous calls to the user/called party were unanswered may receive a reduced number of ring cycles before going to voicemail. The number of ring cycles may also be adjusted where the call answering history suggests the called party is unavailable during certain times.

11 Claims, 3 Drawing Sheets

VARIABLE-TIME CALL FORWARDING TO VOICEMAIL

BACKGROUND

The subject matter relates in general to telephone call processing, and relates more particularly to forwarding unanswered incoming telephone calls to voicemail.

Voicemail messaging is a service offered by many telecommunications providers. In a typical example of a voicemail message service, the service determines whether a called number subscribing to that service is busy or otherwise unavailable to receive an incoming call. If the called number is busy, for example, the typical voicemail service returns a recorded message to the caller instead of completing the call to the called number. The voicemail announcement, which may have been previously recorded by the voicemail-service subscriber, usually includes an invitation for the caller to speak a brief audio message, which the voicemail service records for later electronic delivery to the voicemail subscriber. Voicemail messaging services thus offer subscribers a distinct advantage over the conventional telephone answering machine connected to a single subscriber line, which cannot respond to an incoming call while that line is busy.

When a voicemail subscriber (or user of a subscriber's device) receives an incoming call to an idle subscriber line, the telecommunications provider typically rolls over that call to the voicemail system after sending the subscriber line a predetermined number of ring cycles. Typical voicemail for residential customers is set so that the phone rings four times before the incoming call goes to voicemail. That number of rings is a tradeoff of several factors, hoping to give the customer a reasonable time to answer the phone but recognizing that some callers may lack the patience to wait for more ringing cycles before the call is answered or goes to voicemail. Whatever the number of ringing cycles set for a particular voicemail service, a subscriber unable to answer a ringing phone by that number will miss the call, which has gone to voicemail. That subscriber must wait for the voicemail service to finish recording the caller's message, and then contact the voicemail service to receive that message. Even if the subscriber's voicemail messaging service offers the option to increase the number of ringing cycles before rolling over to voicemail, using that option may subject the subscriber to longer ringing cycles for unwanted calls and may annoy or confuse callers who must wait while their calls go unanswered or unforwarded to voicemail.

SUMMARY

Stated in general terms, exemplary embodiments determine whether there is a history of call answering with a voicemail service subscriber (or the subscriber's device), and use that history to select the number of ring cycles before sending a particular incoming call to the voicemail service. The call history for variable voicemail service according to disclosed embodiments may comprise, without limitation, the identity of a calling party, previous call answering by a user of the voicemail subscriber's device, and user preferences.

Embodiments may identify the calling party of an incoming telephone call placed to a called number that subscribes to a voicemail service. The directory telephone number of the calling party is the typical source of such identity. The identity of the caller comprises a history that determines the number of ring cycles before the incoming call is sent to the voicemail service. If the caller cannot be identified for the voicemail message service, the incoming call receives a default number of ring cycles, after which an unanswered call is sent to the voicemail service.

Stated in somewhat greater detail, embodiments may determine whether a calling party has a history of previous calls placed to a particular called party subscribing to or using a voicemail message service. Based on that history of previous calls, the number of ring cycles for an incoming call from that calling party may be adjusted, either by increasing or decreasing the number of ring cycles from a default value. For example, for callers whose previous calls to a particular subscriber or user have been answered, the number of ring cycles before the next incoming call goes to voicemail may be extended. Conversely, embodiments may reduce the number of ring cycles before sending an incoming call to voicemail, where previous calls to the subscriber or user from that particular caller have gone unanswered.

By further example, embodiments may determine a history of call answering by a voicemail subscriber or user. For example, an embodiment may keep records of the time of day when incoming calls are answered. If the subscriber or user does not answer calls between, say, 8:00 AM to 5:00 PM during certain days, suggesting that the subscriber or user may be at work or otherwise unavailable during those times, then all incoming calls during those times would get fewer than the standard four ring cycles (or another default value) before the calls go to voicemail.

Embodiments of the present invention also permit the subscriber or user to specify a specific number of rings depending on the calling number. In some situations, a particular subscriber or user may prefer that incoming calls from certain callers would ring extra cycles, giving that subscriber or user more time to pick up the call before those calls go to voicemail.

Other systems, methods, and/or computer program products according to embodiments will be or become apparent to one with skill in the art upon review of the following drawings and detailed descriptions. It is intended that all such additional systems, methods, and/or computer program products be included within this description, be within the scope of the present invention, and be protected by the accompanying claims.

DETAILED DESCRIPTION

The above specification, examples and data provide a complete description of the manufacture and use of exemplary embodiments. Since many embodiments of the invention can be made without departing from the spirit and scope of the invention, the invention resides in the claims hereinafter appended.

Figure 1:
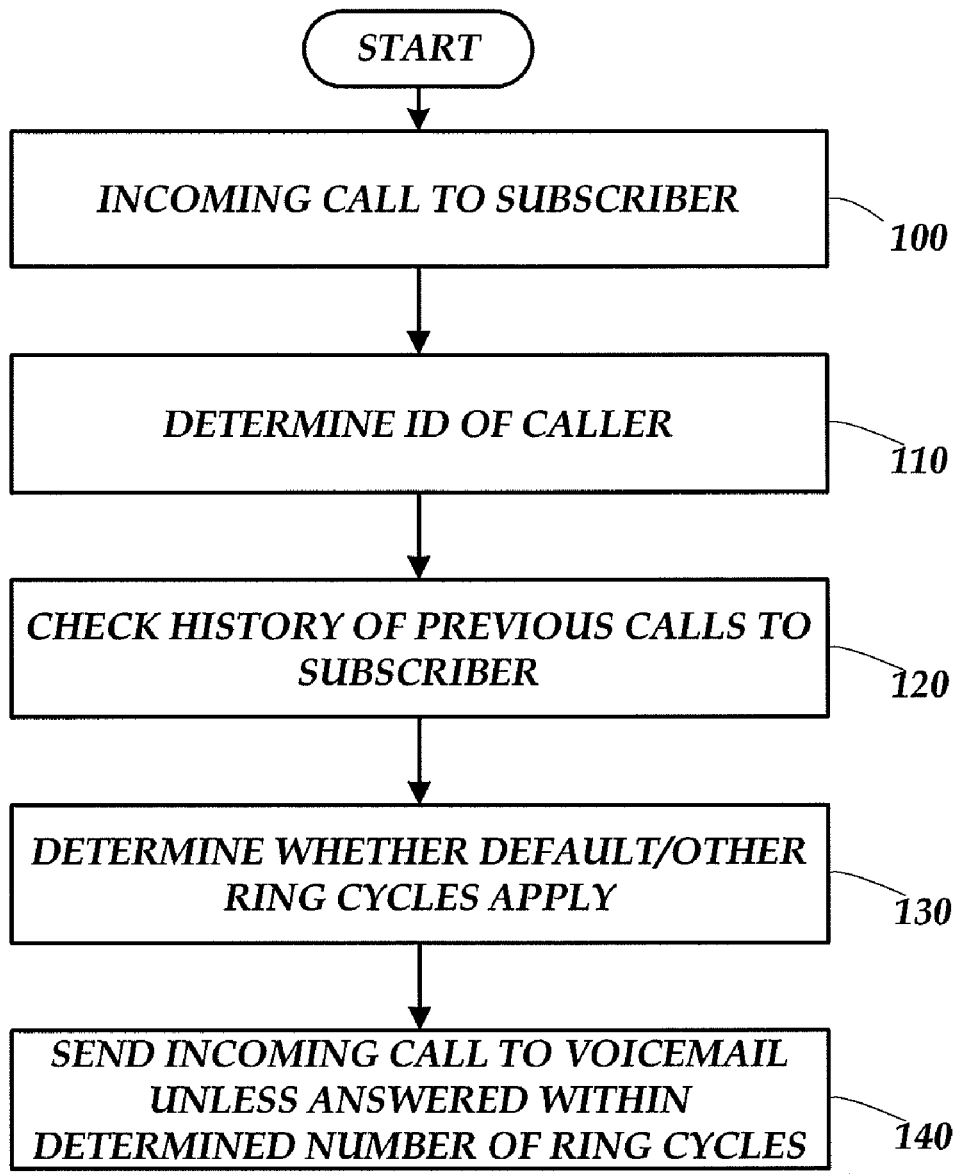
FIG. 1 is a functional diagram illustrating variable-time call forwarding to voicemail according to exemplary embodiments.

FIG. 1 illustrates the work flow of an incoming call to a subscriber or user with variable-time call forwarding according to an exemplary embodiment. The work flow illustrated in that figure commences at 100 with an incoming call to the subscriber or user. At 110, the system produces an identification of the caller by noting a signal identifying, or corresponding to, the directory number associated with the originator of that incoming call. So-called directory-ID services that signal the identity of a calling party are known to those skilled in the art and are not disclosed herein in detail.

Once the identity of the caller is known at 110, the embodiment compares that identity to a database containing a history of previous calls to the called party that subscribes to or uses the variable-time call forwarding. This step appears at 120 in FIG. 1, and is intended to provide information from which the system determines how many ring cycles the incoming call will receive, as at 130. The actual number of ring cycles applied to a particular incoming call may be greater or fewer than a default number of ring cycles, depending on factors that may include the subscriber's or user's history of answering incoming calls from particular identified callers. Moreover, it is envisioned according to disclosed embodiments that a voicemail messaging subscriber or user may specify how many ring cycles a particular incoming call will receive before forwarding that incoming call to the voicemail service. It should also be understood that an incoming call from a subscriber or user with no previous history, determined at 120, may be sent to voicemail after a default number of ring cycles, wherein that default number may be customized for a particular subscriber or user depending on an observed history of call answering for that subscriber or user, or on other input relevant to the subscriber or user. In any case, the system sends the incoming call to voicemail at 140 unless the subscriber or user picks up that call within the determined number of ring cycles.

Figure 2:
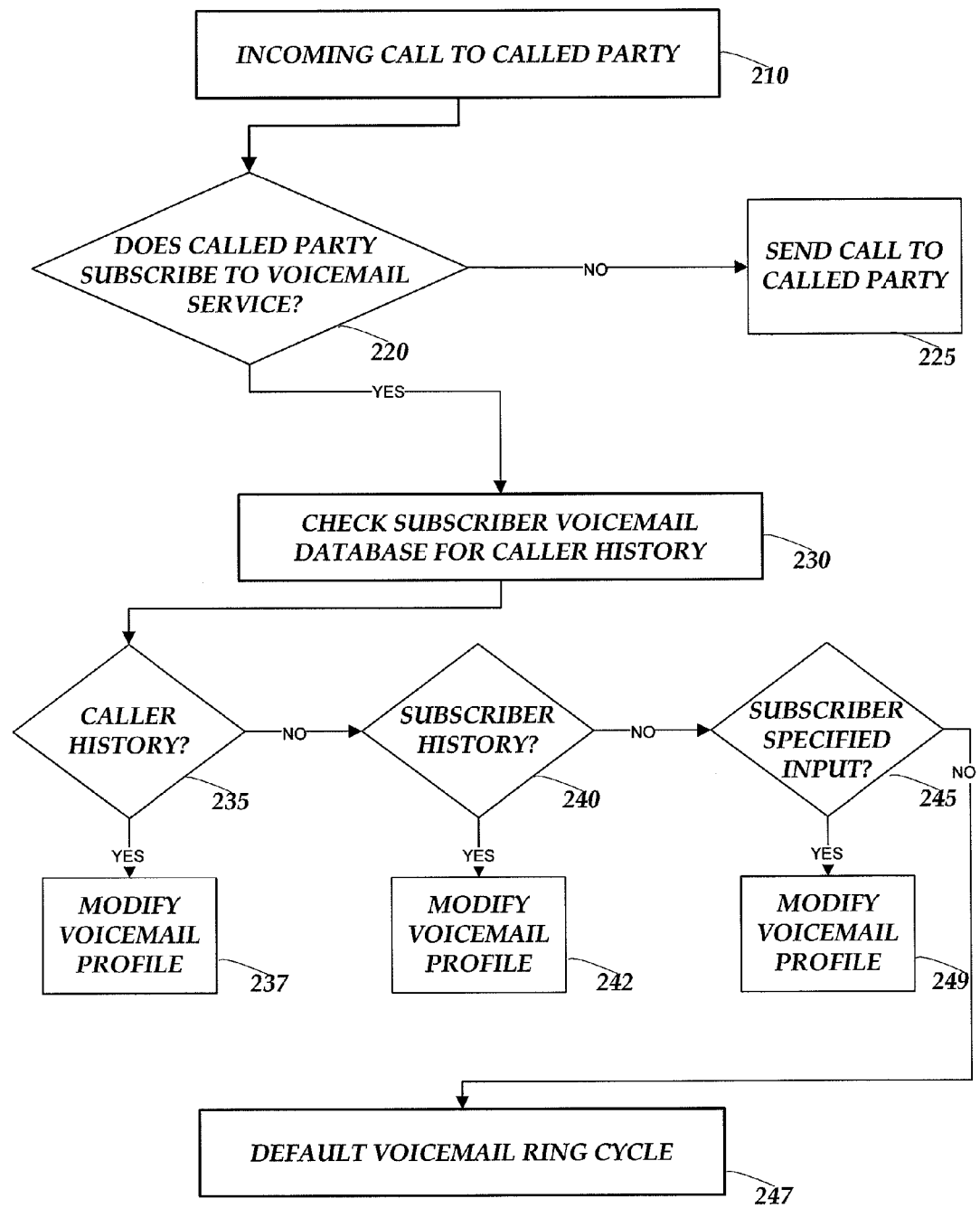
FIG. 2 is a flow chart for the embodiments of FIG. 1.

FIG. 2 illustrates in greater detail an example of variable-time forwarding according to an exemplary embodiment. The process commences in FIG. 2 at 210, with an incoming call directed to a particular called party, namely, an incoming call to a directory number associated with that called party. At decision 220 the process determines whether that called party subscribes to a voicemail service having variable-time call forwarding. If the called party has not subscribed to or does not use a voicemail service, then at 225 the incoming call is sent to the called party in a conventional manner, applying a ringing signal to the called party's subscriber line and also providing a ringback signal to the caller.

However, if the decision 220 determines that the called party does subscribe to or use a voicemail service, then at 230 the process checks a subscriber voicemail database to determine whether a call history 235 exists for the voicemail subscriber or user being called, or between that subscriber or user and the caller. If a call history 235 does exist, then at 237 the process may modify the default voicemail profile to determine a particular number of ring cycles based on that history, before the particular incoming call is forwarded to voicemail. As pointed out below, the process may determine the number of ring cycles based on the incoming-call answering history for the particular subscriber or user. Thus, the process may infer that a subscriber or user who seldom answers incoming calls within some predetermined default number of ring cycles, such as the customary four-ring cycle, requires some greater amount of time to answer his/her incoming calls and, for that subscriber or user, the system may create a history that sets some greater number of ring cycles (relative to the default value) before unanswered incoming calls to that subscriber or user roll over to the subscriber's voicemail service. However, for the subscriber or user who has established a history of answering incoming calls by the second ring, for example, the system may determine some reduced number of ring cycles (again, relative to the default value) before unanswered incoming calls to that subscriber or user are sent to the subscriber's voicemail service. With the variable-time call forwarding as thus described, calls to the slow answerer are less likely go to voicemail prematurely, and unanswered calls to the relatively prompt answerer can go to voicemail with relatively less delay for the calling party.

Returning to FIG. 2, checking the subscriber voicemail database at 230 in the disclosed embodiment leads to determining at 235 whether the voicemail subscriber or user, namely the party being called, has a history relative to the particular caller. If a caller history does exist, then at 237 the process creates a modified voicemail profile determined by or as a function of that history with respect to the voicemail subscriber or user. For example, callers whose incoming calls to the voicemail subscriber or user are always answered may receive a modified voicemail profile determined by that answer history. For example, the subscriber (or user of the subscriber's device/service) may always answer calls from that subscriber's spouse, and that history of always-answered calls may produce a modified voicemail profile 237 to permit a greater number of ring cycles before the subscriber's voicemail service sends that call to voicemail. However, callers whose calls are never answered by the voicemail subscriber or user may receive a modified voicemail profile that rolls over such calls to voicemail after fewer ring cycles than some default value, e.g., after one or two such ring cycles. In either case, the process functions to produce a modified number of ring cycles before sending an unanswered call to voicemail, whether that modified number is greater or lesser than some predetermined default value.

If at 235 the process determines that no previous history exists for the particular caller, at 240 the disclosed embodiment determines whether a history of answered or unanswered calls exists for the particular voicemail subscriber or user being called. For example, for the subscriber or user with a history of answering incoming calls by the second ring, the process may produce at 242 a modified voicemail ring cycle deemed more suitable for a relatively prompt answerer. In that instance, the modified voicemail ring profile may roll over the incoming call to voicemail after receiving only two ring cycles, with the assumption that the normally prompt-answering subscriber or user is not present or otherwise indisposed to take the call. However, and as previously mentioned, the subscriber or user having a history of answering calls only after a greater-than-default number of rings may result in modifying the voicemail profile 242 so that incoming calls to that subscriber or user will routinely receive that greater number of ring cycles before being sent to voicemail.

If decision 240 determines that the voicemail database for the particular subscriber or user has no history for that subscriber or user, then at 245 the process determines whether that subscriber or user has set any specific information for controlling incoming calls to voicemail. If no such specific inputs are found, then at 247 a default voicemail ring cycle is in effect for that subscriber or user, and the unanswered incoming call will receive the default number of ring cycles before going to the subscriber's voicemail service.

If at 245 it is determined that the subscriber or user has given the voicemail system specific instructions for handling incoming calls, then at 249 a modified voicemail profile according to those instructions is accessed to determine the voicemail handling of the particular incoming call. The kind and number of subscriber-specified inputs may be a function of the particular voicemail system offered to a subscriber or user and the preferences of the subscriber or user. For example, if the subscriber or user knows the phone is not being answered between 8:00 AM and 5:00 PM on certain days, then all incoming calls during those times would get either the default four-ring cycle before going to voicemail or would go to voicemail after some other number of ring cycles selected by the subscriber or user. The typical subscriber or user, in that situation, might choose a reduced number of ring cycles before sending calls to voicemail during times the subscriber or user is not answering incoming calls.

As a further example of subscriber or user-specified input according to disclosed embodiments, a voicemail subscriber or user may specify a particular number of ring cycles depending on the calling number. That feature would be useful, for example, if the subscriber or user could be called from a simultaneous ring service, which those skilled in the art will understand as a service that rings a plurality of phone numbers identified by a subscriber or user, when someone calls any of those numbers. Whichever phone the subscriber or user first picks up gets the call, and the call then goes to voicemail if no phone answers the call. In such cases, a subscriber or user might desire that the phone would ring extra cycles before the call would go to voicemail. In other situations, a subscriber or user may identify certain numbers to receive extra rings, or to receive fewer rings than the predetermined default number, before sending to voicemail calls from those identified numbers.

Although providing a modified voicemail profile in response to the time of day is described above as a subscriber or user-specified input, it should be understood that adaptive time-of-day modification may also take place in response to learning the call-answering history of the particular subscriber or user. For example, where a subscriber or user does not answer incoming calls between 9:00 AM and 5:00 PM on weekdays, the present system may adapt to that history of unanswered calls by providing a modified voicemail profile 242 for incoming calls during that period of time. Such incoming calls, for example, could receive a reduced number of ring cycles before going to voicemail. Thus, it will be understood that certain attributes of incoming-call voicemail processing according to disclosed embodiments may take place either through direct subscriber or user input to an administration element of the voicemail system, or through a learned response based on the subscriber's or user's history of answering or non-answering incoming calls from particular phone numbers.

Figure 3:
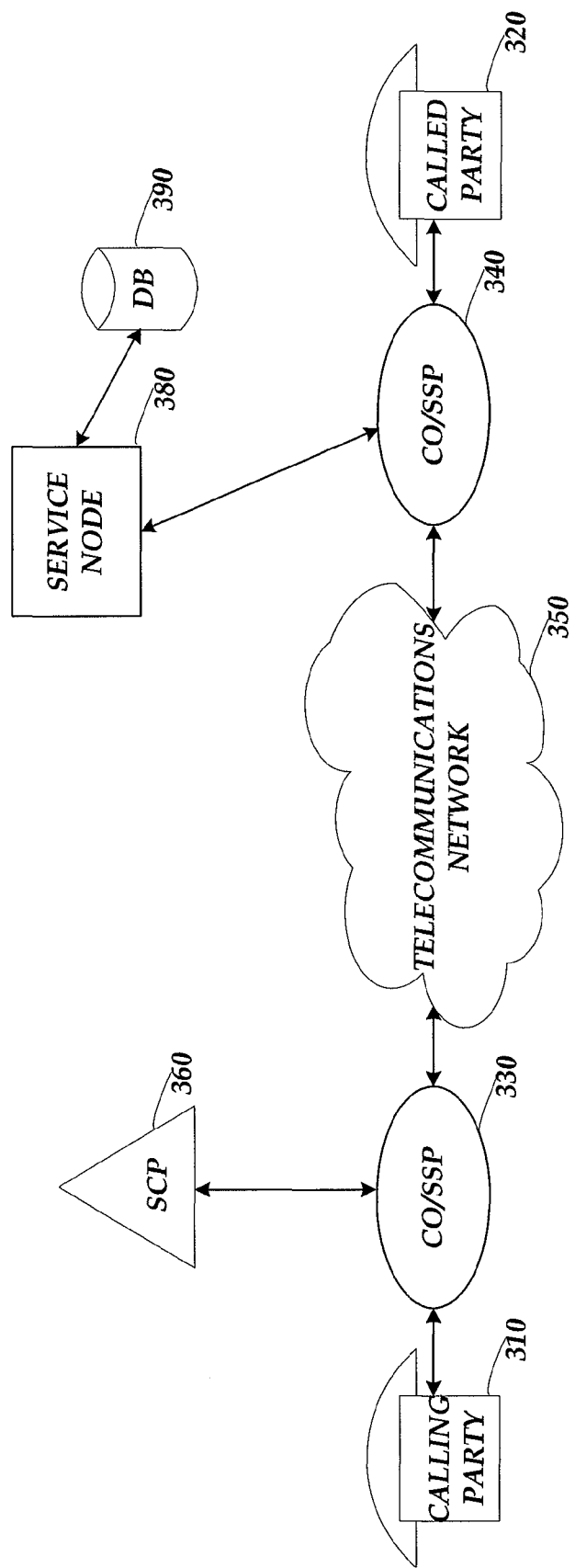
FIG. 3 is a block diagram showing an apparatus according to an exemplary embodiment.

FIG. 3 is a block diagram showing an illustrative embodiment of a telecommunications system such as the Public Switched Telephone Network (PSTN) to provide variable-time call forwarding according to the disclosed embodiment. The telecommunications system shown in FIG. 3 comprises a calling-party phone 310 and a called-party phone 320, each of which is connected to a respective central office or Service Switching Point (SSP) switch 330 and 340. Those skilled in the art will realize that each SSP switch 330 and 340 typically has a number of subscriber lines connected thereto, with each subscriber line extending between the SSP switch and customer premises equipment such as the telephones 310 and 320, for example. Moreover, those skilled in the art will understand that the SSP switches 330 and 340 may communicate with each other through the telecommunication network 350 to establish voice and signaling communication between the respective SSP switches and the subscriber lines connected to those switches. Further yet, each SSP switch 330, 340 is operationally connected to a Service Control Point (SCP) 360, 370 which may store and implement programming for operation of the respective SSP switches. Further details of the construction and functioning of a typical PSTN are well-known in the art and documented in the art and, for that reason, are not further described herein.

The system illustrated in FIG. 3 also includes a communications or service node (SN) 380 operatively associated with the SSP switch 340 servicing the called party 320. A database 390 is operatively associated with the SN 380, in a manner known to those skilled in the art. The SN 380 may be used to provide the SSP switch 340 and the associated subscriber lines with the enhanced features described above with respect to FIGS. 1 and 2, namely, variable time call forwarding. Those skilled in the art will appreciate that the service node 380 may also be used, in combination with the SSP switch 340, to provide other service enhancements.

Referring to the embodiment discussed above with respect to FIG. 2, it is assumed the called party 320 is a customer (or user of a customer's device/service) who subscribes to a voicemail service as embodied herein. A trigger is placed on that customer's subscriber line, in accordance with customary practice. When an incoming call to the called party 320 arrives at the SSP 340, that trigger directs the incoming call to the service node 380 associated with the SSP 340. The service node 380 is programmed to access the database 390 to determine variables such as the caller history 235 for the calling party 310, the subscriber (or user) history 240, and any subscriber (or user) specified input 245, each as discussed above. As mentioned previously, the directory number of the calling party 310 is included in the data link transmitted by the telecommunication network 350 to the SSP 340 associated with the called party 320.

Based on the information available to the service node 380 from the database 390, service logic within the service node will decide when to place the call to the called party 320, or how many ring cycles the incoming call will receive before the service node would send that incoming call to the voicemail service. The service node 380 may also be programmed to accept subscriber or user specified input, e.g., either from subscriber or user access through the keypad on the subscriber's or user's phone or other communication device, or through customer access by a Web-based browser connection (not shown) to the service node 380.

Although the embodiment shown in FIG. 3 is disclosed in the context of a land line switch system utilizing the PSTN as previously mentioned, it should be understood that the variable-time call forwarding to a voicemail system may also be implemented through other systems for delivering telephone calls, such as a VOIP-based system, rather than the more traditional switched wireline system. For example, an incoming call over a VOIP-based system may go to a communications node comprising a feature server associated with the entity that connects with and terminates calls to the subscriber's or user's phone. That feature server would include the processing logic needed to perform the evaluation steps described with respect to FIG. 2, including memory for maintaining the caller history, the subscriber or user history, and any subscriber or user-specified input. Based on that processing logic and historical data, the feature server would tell the called gateway whether to send the call to voicemail, or would indicate to the gateway the number of ring cycles (default or modified) returned to the calling party 310 before the call is forwarded to the voicemail service.

It should be understood that the foregoing relates only to disclosed embodiments of the present invention, and that modifications and changes thereto maybe made without departing from the spirit or scope of the following claims.

The invention claimed is:

1. A method for sending to voicemail an incoming telephone call from a calling party to a called party using a subscription to a voicemail service, comprising:
  determining whether there is a history associated with the voicemail service; and if the incoming call is not answered by the called party after a number of ring cycles determined by the history, sending the incoming call to the voicemail service;

wherein the history is a learned response based on called party history of answering and non-answering prior incoming calls from particular phone numbers, the history including the identity of the calling party;

wherein generating the history includes:

determining whether the called party answered a previous call from the calling party before the previous call was sent to voicemail; and setting the number of ring cycles for sending to voicemail the incoming telephone call in response to whether the called party answered the previous call before going to voicemail.

2. The method of claim 1, further comprising:

setting a default number of ring cycles before an incoming call is sent to voicemail;

determining whether a previous call from the calling party was answered by the called party before going to voicemail after the default number of ring cycles; and if so increasing the default number of ring cycles before sending to voicemail a next incoming call from the calling party.

3. The method of claim 1, wherein the history of call answering by the called party comprises time of day and day of week at which a previous incoming call to the subscriber was sent to voicemail after a number of ring cycles.

4. The method of claim 1, further comprising setting the number of ring cycles for sending to voicemail an incoming call from a certain calling party in response to an input received from the called party.

5. The method of claim 1, further comprising:

maintaining a database of answer history for previous calls to called party numbers that have voicemail service;

in response to the incoming telephone call, querying the database to determine whether the calling party has an answer history; and determining the number of ring cycles for sending the incoming call to voicemail in response to the answer history for the calling party.

6. The method of claim 5, further comprising:

setting a default number of ring cycles if the calling party has no answer history with respect to the called party.

7. A system for sending to voicemail an incoming telephone call from a calling party to a called party using a subscription to a voicemail service, comprising:

a communications node, in communication with the voicemail service, the communications node operative to:

determine whether there is a history associated with the voicemail service; and if the incoming call is not answered by the called party after a number of ring cycles determined by the history, send the incoming call to the voicemail service; and a database operative to maintain an answer history for previous calls to called party numbers that have the voicemail service;

wherein the history is a learned response based on called party history of answering and non-answering prior incoming calls from particular phone numbers wherein the history comprises the identity of the calling party;

wherein the communications node generates the history by:

determining whether the called party answered a previous call from the calling party before the previous call was sent to voicemail; and setting the number of ring cycles for sending to voicemail the incoming telephone call in response to whether the called party answered the previous call before going to voicemail.

8. The system of claim 7, wherein the communications node is further operative to:

set a default number of ring cycles before an incoming call is sent to voicemail;

determine whether a previous call from the calling party was answered by the called party before going to voicemail after the default number of ring cycles; and if so increase the default number of ring cycles before sending to voicemail a next incoming call from the calling party.

9. The system of claim 7, wherein the history of call answering by the called party comprises time of day and day of week at which a previous incoming call to the subscriber was sent to voicemail after a number of ring cycles.

10. The system of claim 7, wherein the communications node is further operative to:

in response to the incoming telephone call, query the database to determine whether the calling party has an answer history; and determine the number of ring cycles for sending the incoming call to voicemail in response to the answer history for the calling party.

11. The system of claim 10, wherein the communications node is further operative to set a default number of ring cycles if the calling party has no answer history with respect to the called party.

* * * * *